Oct. 28, 1941.  C. W. SINCLAIR  2,260,645

BRAKE

Filed Sept. 18, 1939

INVENTOR.
CHARLES W. SINCLAIR
BY
ATTORNEYS

Patented Oct. 28, 1941

2,260,645

UNITED STATES PATENT OFFICE 2,260,645

BRAKE

Charles W. Sinclair, Detroit, Mich., assignor to Kelsey-Hayes Wheel Company, Detroit, Mich., a corporation of Delaware Application September 18, 1939, Serial No. 295,521

7 Claims. (Cl. 188—79.5)

The invention relates to brakes and refers more particularly to adjustment devices for the brake friction means.

The invention has for an object to provide an improved adjustment device which forms a unit extending transversely of the backing plate completely at the inside thereof so that the device is completely housed and protected from water, dirt and the like.

The invention has for another object to provide an adjustment device which is normally held from movement relative to the brake shoes to avoid rattle and which is free to move with the brake shoes when the brake is applied.

Figures 1, 2:
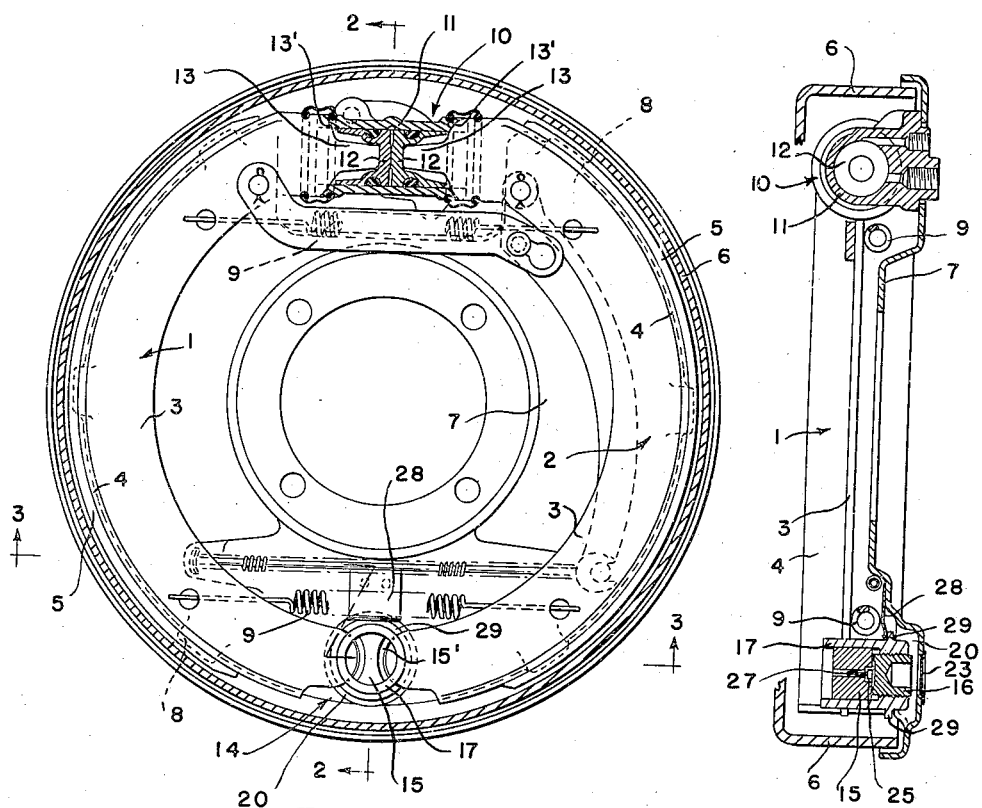
Figure 3:
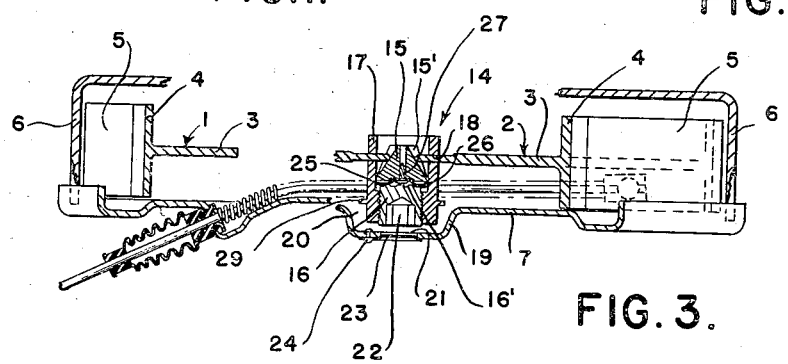

These and other objects of the invention will become apparent from the following description, taken in connection with the accompanying drawing, in which Figure 1 is a sectional elevation illustrating a brake embodying my invention;

Figures 2 and 3 are cross sections on the lines 2—2 and 3—3, respectively, of Figure 1.

As illustrated in the present instance, the brake friction means comprises the brake shoes 1 and 2, the upper and lower ends of which are separated. Each brake shoe is of T-section and has the radially extending web 3 and the axially extending flange 4, the latter having secured to its outer face the brake lining 5. The brake linings are engageable with the brake flange 6 of the brake drum which may be of usual construction and is secured to a motor vehicle wheel. 7 is the backing plate which is secured to either the rear axle housing or the steering spindle of the motor vehicle. As shown, the backing plate is formed with the lands 8 which are engaged by the adjacent edges of the axial flanges 4 of the brake shoes. In the present instance, the brake shoes are held against the lands by means of the retracting springs 9 having their coils located between the plane of the webs 3 and the backing plate 7 and their ends overlapping the webs opposite the backing plate. 10 is a wheel cylinder for spreading the upper ends of the brake shoes apart and into frictional engagement with the brake flange. The wheel cylinder comprises the cylinder 11 secured to the backing plate and the pistons 12 within the cylinder having the outer sides of their heads abutting the reduced extensions 13 formed upon the upper ends of the webs. In the retracted position of the brake shoes, the ends of the cylinder 11 engage the shoulders 13' formed upon the upper ends of the webs to limit the movement of the upper ends of the brake shoes toward each other. The construction is such that when the brake is applied the brake shoes are circumferentially movable in both directions of rotation of the brake drum and the circumferential movement is limited by engagement of a shoulder upon one of the webs with the associated end of the cylinder.

For the purpose of adjusting the brake shoes to maintain the desired clearance between their linings and the brake flange, the adjustment device 14 is provided between the lower ends of the webs 3. This adjustment device is a unit having its axis extending transversely of the backing plate 7 and the webs 3 and comprises the wedge 15, the screw 16 and the bracket 17 which houses the wedge and screw. The bracket is formed with the diametrically opposite openings 18 through which the reduced lower ends of the webs 3 extend into engagement with the inclined walls of the diametrically opposite grooves 15' in the wedge 15. The screw 16 threadedly engages the bracket and is adapted to be rotatably adjusted in the bracket to axially adjust the wedge. The adjustment device is located completely at the inside of the backing plate so that it will be protected from water, dirt and the like, and to accomplish this, the backing plate is formed with the boss 19 which provides the pocket 20 for freely receiving the adjacent end of the bracket. The size of the boss is sufficient to permit the adjustment device to move freely circumferentially with the lower ends of the brake shoes when the brake is applied. The bottom of the boss is formed with the opening 21 through which a suitable tool may be inserted into the polygonal recess 22 formed in the screw 16 to adjust the latter. The hole 21 is normally closed by the spring plate 23 which is pivotally secured by the rivet 24 to the backing plate.

For the purpose of holding the screw in its adjusted positions and at the same time providing a means for indicating the amount of adjustment, the end of the wedge adjacent the screw is formed with the diametrically extending groove 25 in which is located the spring 26. The middle of the spring is secured to the wedge by the pin 27 and the ends of the spring are adapted to ride over the notches 16' formed in the adjacent end of the screw. It will be noted that during adjustment of the screw the wedge is held from rotation by means of the ends of the webs of the brake shoes engaging the grooves in the wedge and that the spring is held from rotation by reason of its being located in the groove in the wedge.

To prevent rattle, the bracket is resiliently held from movement relative to the webs of the brake shoes by means of the spring plate 28 having one end secured to the backing plate 7 and the other end abutting the flange 29 formed upon the bracket, the spring plate resiliently urging the bracket toward the backing plate and the outer surfaces of its openings 18 against the webs.

What I claim as my invention is:

1. In a brake, the combination with a backing plate and brake friction means having adjacent ends, of an adjustment device completely at the inside and extending transversely of said backing plate comprising a wedge between and engaged by said ends, an adjustable member for axially adjusting said wedge, and a bracket for housing said wedge and adjustable member, said backing plate being formed with a boss providing a pocket for freely receiving said bracket and means for holding the bracket from movement relative to said brake friction means.

2. In a brake, the combination with a backing plate and brake friction means having adjacent ends, of an adjustment device completely at the inside of said backing plate comprising a wedge between and engaged by said ends, a bracket for said wedge free to move with said ends, and a member adjustably mounted on said bracket for axiliary adjusting said wedge, said member extending transversely of and being adjustable from outside said backing plate, and spring means between said backing plate and bracket for resiliently holding said bracket from movement relative to said shoes.

3. In a brake, a backing plate, brake friction means having adjacent ends spaced from each other, an adjustment device completely at the inside of the backing plate and comprising a wedge located between the ends of the friction means for actuating the latter, a bracket housing for the wedge free to move with said friction means and having slots in opposite sides for receiving the ends of the friction means to permit engagement of said ends with opposite sides of the wedge, means for adjusting said wedge also carried by the bracket housing, and spring means connecting the ends of the friction means and positioned to urge the friction means and bracket housing in a direction toward the backing plate.

4. In a brake, a brake drum, a backing plate for the brake drum having a boss forming a pocket opening into the brake drum, brake friction means having the adjacent ends spaced from each other, an adjustment device located completely within the brake drum at the inner side of the backing plate and extending transversely of said backing plate, said adjustment device comprising a wedge movable transversely of the backing plate between said ends for actuating the latter, a bracket housing for the wedge having slots in opposite side walls thereof for receiving the spaced ends of the friction means to permit engaging said ends with opposite sides of the wedge, an adjustable member mounted in the bracket for actuating the wedge, said bracket extending into the pocket and the latter being of sufficient size to permit free movement of the bracket with the friction means, and spring means connecting the ends of the friction means and located in a position to urge the friction means and bracket housing toward the backing plate.

5. In a brake, a backing plate, brake friction means having the adjacent ends spaced from each other, an adjustment device completely at the inside and extending transversely of the backing plate, said adjustment device comprising a wedge movable transversely of the backing plate between the spaced ends of the friction means for actuating the latter, an adjustable member for actuating the wedge, a bracket housing for the wedge and adjustable member movable with the friction means, said bracket housing having slots in opposite side walls thereof for receiving the ends of the friction means to permit engaging said ends with opposite sides of the wedge, and spring means urging the bracket housing toward the backing plate and holding the outboard sides of the slots against the adjacent sides of the ends of said friction means.

6. In a brake, a backing plate, brake friction means having the adjacent ends spaced from one another, an adjustment device completely at the inside and extending transversely of said backing plate, said adjustment device comprising a wedge movable transversely of the backing plate between the ends of the friction means for actuating the latter, an adjustable member for actuating said wedge, a bracket housing for the wedge and adjustable member movable with the friction means, said bracket housing having slots in opposite sides thereof for receiving the ends of the friction means to permit engagement of said ends with opposite sides of the wedge, spring means connecting the ends of the friction means and positioned to urge the friction means and housing toward the backing plate, and spring means urging said bracket housing toward the backing plate and holding the outboard sides of the slots against the adjacent sides of the ends of said friction means.

7. In a brake, a backing plate, brake friction means having the adjacent ends spaced from one another, an adjustment device completely at the inside and extending transversely of said backing plate, said adjustment device comprising a wedge movable transversely of the backing plate between the ends of the friction means for actuating the latter, an adjustable member for actuating said wedge, a bracket housing for the wedge and adjustable member movable with the friction means, said bracket housing having slots in opposite sides thereof for receiving the ends of the friction means to permit engagement of said ends with opposite sides of the wedge, spring means connecting the ends of the friction means and positioned to urge the friction means and housing toward the backing plate, spring means urging said bracket housing toward the backing plate and holding the outboard sides of the slots against the adjacent sides of the ends of said friction means, and a laterally extending boss in the backing plate forming a pocket for receiving the bracket housing and having a dimension sufficient to permit movement of the bracket housing with said friction means.

CHARLES W. SINCLAIR.